US011978573B2

(12) United States Patent
Okamoto et al.

(10) Patent No.: US 11,978,573 B2
(45) Date of Patent: May 7, 2024

(54) COAXIAL CABLE

(71) Applicant: SUMITOMO ELECTRIC INDUSTRIES, LTD., Osaka (JP)

(72) Inventors: Takaaki Okamoto, Tochigi (JP); Yuji Ochi, Tochigi (JP); Ryuuta Furuyashiki, Tochigi (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 380 days.

(21) Appl. No.: 17/597,447

(22) PCT Filed: Aug. 18, 2021

(86) PCT No.: PCT/JP2021/030219
§ 371 (c)(1),
(2) Date: Jan. 6, 2022

(87) PCT Pub. No.: WO2022/059406
PCT Pub. Date: Mar. 24, 2022

(65) Prior Publication Data

US 2022/0319742 A1 Oct. 6, 2022

(30) Foreign Application Priority Data

Sep. 16, 2020 (JP) ................................ 2020-155643

(51) Int. Cl.
*H01B 7/02* (2006.01)
*H01B 11/18* (2006.01)
*H01B 13/016* (2006.01)

(52) U.S. Cl.
CPC ....... *H01B 13/016* (2013.01); *H01B 11/1891* (2013.01)

(58) Field of Classification Search
CPC ... H01B 7/02; H01B 7/04; H01B 7/11; H01B 7/1875; H01B 7/0275; H01B 7/06;
(Continued)

(56) References Cited

U.S. PATENT DOCUMENTS 10,763,012 B2 * 9/2020 Watanabe .......... H01B 11/1808
2007/0295525 A1 * 12/2007 Chiruvella ............ C08L 71/123
174/110 F (Continued)

FOREIGN PATENT DOCUMENTS

JP S56-126207 10/1981
JP 2015-130280 A * 1/2014 ............... H01B 7/02

(Continued)

*Primary Examiner* — William H. Mayo, III
(74) *Attorney, Agent, or Firm* — IPUSA, PLLC

(57) ABSTRACT

A coaxial cable includes an inner conductor having one center wire, and six outer wires stranded around the center wire, an insulator covering an outer periphery of the inner conductor, and a shield conductor covering an outer periphery of the insulator, wherein, in a cross section perpendicular to a longitudinal direction of the coaxial cable, a ratio of a total area of first regions which are respectively formed by a gap between the center wire and two adjacent outer wires, with respect to an area of a circumscribed circle of the inner conductor, is 0.5% or higher and 2.0% or lower, and a ratio of a total area of second regions which are respectively formed by a gap between surfaces of the two adjacent outer wires and a surface of the insulator, with respect to the area of the circumscribed circle of the inner conductor, is 2.0% or higher and 5.0% or lower.

14 Claims, 4 Drawing Sheets

(58) Field of Classification Search
CPC . H01B 11/1891; H01B 11/026; H01B 11/033; H01B 11/1808; H01B 11/20; H01B 13/016
USPC ...... 174/32, 33, 36, 102 R, 103, 105 R, 106, 174/107, 108, 110 R–120 R
See application file for complete search history.

(56) References Cited

U.S. PATENT DOCUMENTS

2016/0099092 A1* 4/2016 Huang ................. H01B 11/183 174/113 R
2019/0304633 A1 10/2019 Watanabe et al.
2021/0065935 A1* 3/2021 Huang ................. H01B 11/183
2021/0399396 A1* 12/2021 Huang ...................... H01P 3/06

FOREIGN PATENT DOCUMENTS

JP 2015-130280 7/2015
JP WO 2015/104899 A * 7/2015 ............... H01B 7/02
JP 2019-175781 10/2019

* cited by examiner

10

COAXIAL CABLE

TECHNICAL FIELD

The present disclosure relates to coaxial cables.

This application is based upon and claims priority to Japanese Patent Application No. 2020-155643 filed on Sep. 16, 2020, the entire contents of which are incorporated herein by reference.

BACKGROUND ART

Patent Document 1 describes a shielded cable including an inner conductor, an insulator provided to cover an outer periphery of the inner conductor, and an outer conductor provided to cover an outer periphery of the insulator, wherein the outer conductor includes a first outer conductor including a spiral shield having first wires wound spirally around an outer periphery of the insulator, and a second outer conductor, provided to cover an outer periphery of the first outer conductor, and including a braided shield having braided second wires.

PRIOR ART DOCUMENTS

Patent Documents

Patent Document 1: Japanese Laid-Open Patent Publication No. 2019-175781

DISCLOSURE OF THE INVENTION

A coaxial cable according to the present disclosure includes an inner conductor having one center wire, and six outer wires stranded around the center wire;

an insulator covering an outer periphery of the inner conductor; and a shield conductor covering an outer periphery of the insulator, wherein, in a cross section perpendicular to a longitudinal direction of the coaxial cable, a ratio of a total area of first regions which are respectively formed by a gap between the center wire and two adjacent outer wires, with respect to an area of a circumscribed circle of the inner conductor, is 0.5% or higher and 2.0% or lower, and a ratio of a total area of second regions which are respectively formed by a gap between surfaces of the two adjacent outer wires and a surface of the insulator, with respect to the area of the circumscribed circle of the inner conductor, is 2.0% or higher and 5.0% or lower.

MODE OF CARRYING OUT THE INVENTION

Figure 1:
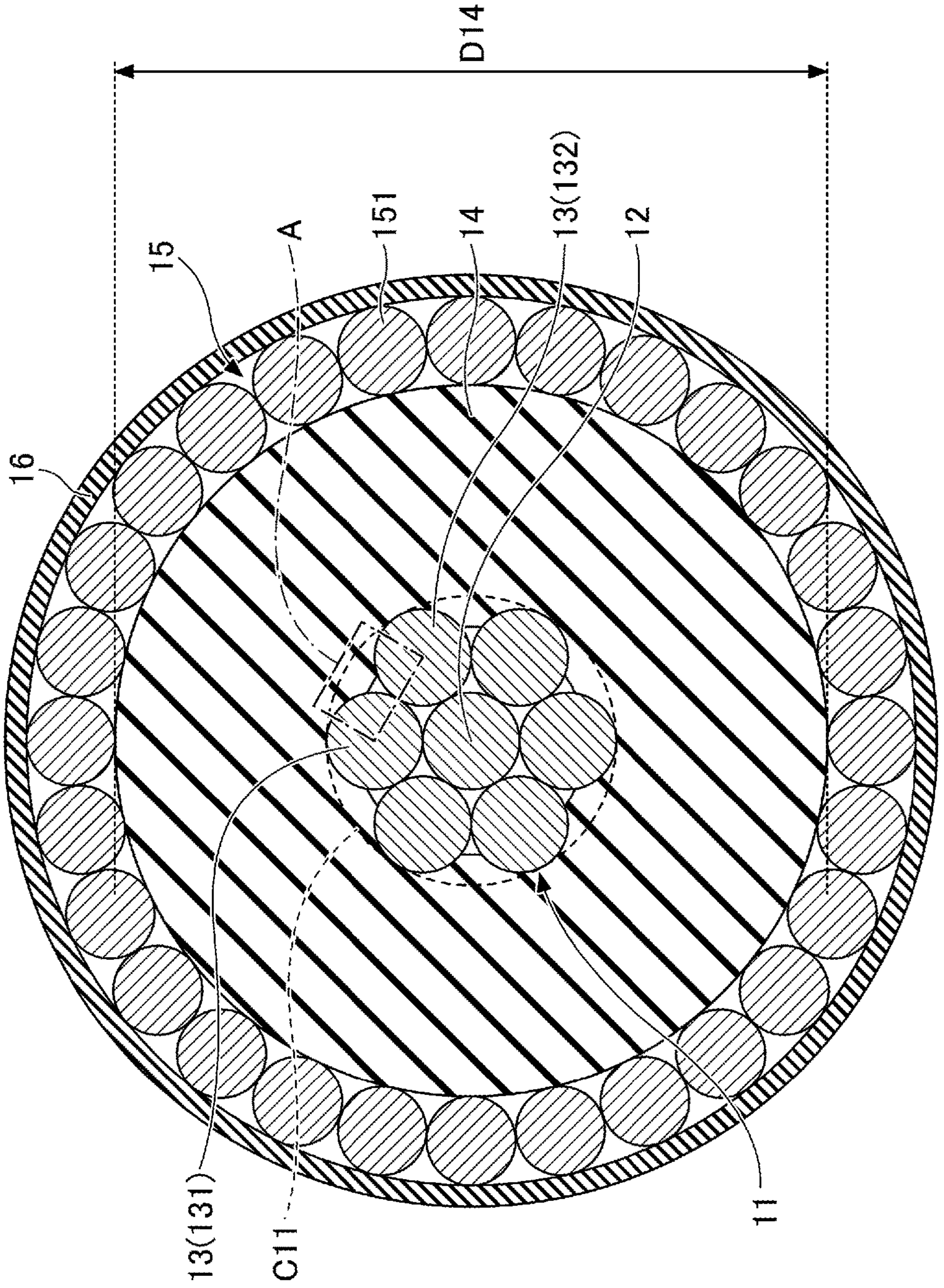
FIG. 1 is a cross sectional view of a coaxial cable according to one embodiment of the present disclosure along a plane perpendicular to a longitudinal direction.

Problem to be Solved by Present Disclosure

As described in Patent Document 1, coaxial cables for transmitting high-speed signals have been studied. However, a data transfer rate between electronic devices is increasing on a daily basis. Accordingly, the required transmission speeds and frequency bands for the coaxial cables connecting the electronic devices have also increased and become high, respectively.

As a characteristic value for evaluating the coaxial cable for high-speed transmission, the skew is known as a value defined by a difference between delay times of two coaxial cables of the same length and type.

In Thunderbolt (registered trademark) 3, which is one of the high-speed general-purpose data carrier technologies already reduced to practice, the required skew is less than 10 ps/m. Data transfer standards faster than Thunderbolt 3 are likely to require the skew having a value less than 10 ps/m.

In order to achieve such a skew, the variation in the skew of the coaxial cable also needs to be smaller than the conventionally required value.

In addition, because the coaxial cable may be bent repeatedly depending on the installed location, the mode of use, or the like, an excellent bending resistance is also required of the coaxial cable.

Accordingly, one object of the present disclosure is to provide a coaxial cable having an excellent bending resistance and reduced variation in the skew.

Effects of Present Disclosure

According to the present disclosure, it is possible to provide a coaxial cable having an excellent bending resistance and reduced variation in the skew.

Embodiments of the present disclosure are described in the following.

DESCRIPTION OF EMBODIMENTS OF PRESENT DISCLOSURE

First, embodiments of the present disclosure will be described in the following. In the following description, the same or corresponding elements are designated by the same reference numerals, and a repeated description of such elements will be omitted.

(1) A coaxial cable according to one embodiment of the present disclosure includes:

an inner conductor having one center wire, and six outer wires stranded around the center wire;

an insulator covering an outer periphery of the inner conductor; and a shield conductor covering an outer periphery of the insulator, wherein, in a cross section perpendicular to a longitudinal direction of the coaxial cable, a ratio of a total area of first regions which are respectively formed by a gap between the center wire and two adjacent outer wires, with respect to an area of a circumscribed circle of the inner conductor, is 0.5% or higher and 2.0% or lower, and a ratio of a total area of second regions which are respectively formed by a gap between surfaces of the two adjacent outer wires and a surface of the insulator, with respect to the area of the circumscribed circle of the inner conductor, is 2.0% or higher and 5.0% or lower.

The ratio of the total area of the first regions which are respectively formed by the gap between the center wire and two adjacent outer wires, with respect to the area of the circumscribed circle of the inner conductor, may be regarded as an area ratio of the first regions.

In this case, when the area ratio of the first regions is 2.0% or lower, the inner conductor is sufficiently compressed, and irregularities generated at an outer surface of the inner conductor can be reduced. For this reason, when the insulator is arranged around the outer periphery of the inner conductor, it is possible reduce a variation in the amount of the gap, while reducing the generation of the gap between the inner conductor and the insulator. As a result, it is possible to reduce a variation in the electrostatic capacitance of the coaxial cable, and to reduce a variation in the skew.

However, when attempts are made to excessively compress the inner conductor, a plurality of steps become required, and the productivity may deteriorate. For this reason, the area ratio of the first region is preferably 0.5% or higher. The productivity can be increased by setting the area ratio of the first region to 0.5% or higher.

The ratio of the total area of the second regions which are respectively formed by the gap between the surfaces of the two adjacent outer wires and the surface of the insulator, with respect to the area of the circumscribed circle of the inner conductor, may be regarded as an area ratio of the second region.

The area ratio of the second region indicates the extent to which the irregularities at the surface of the inner conductor are filled with the insulator. For this reason, by setting the area ratio of the second region to 5.0% or lower, the amount of the gap between the inner conductor and the insulator is sufficiently reduced. As a result, it is possible to reduce the variation in the electrostatic capacitance of the coaxial cable, and to reduce the variation in the skew.

However, it is difficult to completely fill the irregularities at the surface of the inner conductor with the insulator. For this reason, the area ratio of the second region is preferably 2.0% or higher. The productivity can be increased by setting the area ratio of the second region to 2.0% or higher.

(2) A ratio of a total length of contact portions where a circumference of the circumscribed circle and the inner conductor make contact, with respect to the circumference of the circumscribed circle of the inner conductor, may be 40% or higher and 70% or lower.

The ratio of the total length of the contact portions where the circumference of the circumscribed circle and the inner conductor make contact, with respect to the circumference of the circumscribed circle of the inner conductor, may be regarded as a ratio of the contact portions.

When the inner conductor is completely compressed, the cross section perpendicular to the longitudinal direction becomes a circular shape, and completely overlaps the circumscribed circle. In other words, the ratio of the contact portions described above becomes 100%.

However, when attempts are made to excessively compress the inner conductor, a plurality of steps become required, and the productivity may deteriorate. For this reason, the ratio of the contact portions is preferably 70% or lower. The productivity can be increased by setting the ratio of the contact portions to 70% or lower.

In addition, when the ratio of the contact portions is 40% or higher, the inner conductor is sufficiently compressed. For this reason, when the insulator is arranged around the outer periphery of the inner conductor, it is possible to sufficiently reduce the amount of the gap between the inner conductor and the insulator. As a result, it is possible to reduce the variation in the electrostatic capacitance of the coaxial cable, and to reduce the variation in the skew.

(3) An outer diameter of the circumscribed circle of the inner conductor may be 0.1 mm or greater and 0.4 mm or less.

When the outer diameter (diameter) of the circumscribed circle of the inner conductor is 0.4 mm or less, it is possible to reduce the outer diameter of the coaxial cable, and to make the coaxial cable easy to handle. In addition, when the outer diameter of the circumscribed circle of the inner conductor is 0.1 mm or greater, it is possible to make the coaxial cable highly reliable.

(4) An outer diameter of the insulator may be 0.25 mm or greater and 1.5 mm or less.

When the outer diameter of the insulator is 0.25 mm or greater, it is possible to increase particularly the bending resistance. In addition, when the outer diameter of the insulator is 1.5 mm or less, it is possible to reduce the outer diameter of the coaxial cable, and to make the coaxial cable easy to handle.

(5) The center wire and the outer wires may be silver plated soft copper wires.

When using the silver plated soft copper wire is used as the material of the center wire forming the inner conductor, and the outer wires, it is possible to provide a coaxial cable having a high reliability and excellent high frequency characteristics.

(6) The shield conductor may be a spiral shield conductor.

When the shield conductor is the spiral shield conductor, the coaxial cable can be made more flexible than a coaxial cable having a braided configuration, and the bending resistance can be increased.

(7) A ratio of a total area of third regions respectively surrounded by the circumscribed circle of the inner conductor and the surfaces of the two adjacent outer wires, with respect to the area of the circumscribed circle of the inner conductor, may be 7% or higher and 14% or lower.

The ratio of the total area of the third regions respectively surrounded by the circumscribed circle of the inner conductor and the surfaces of the two adjacent outer wires, with respect to the area of the circumscribed circle of the inner conductor, may be regarded as an area ratio of the third region.

The area ratio of the third region described above is an index indicating the extent of the irregularities at the outer surface of the inner conductor. The area ratio of the third region is also an index indicating the extent of the compression of the inner conductor, and the higher the extent of the compression becomes, the smaller the area ratio of the third region becomes.

When the area ratio of the third region is 14% or lower, the inner conductor is sufficiently compressed, and it is possible to reduce the irregularities generated at the outer surface of the inner conductor. For this reason, when the insulator is arranged around the outer surface of the inner conductor, it is possible to reduce the variation in the amount of the gap, while reducing the generation of the gap between the inner conductor and the insulator. As a result, it is possible to reduce the variation in the electrostatic capacitance of the coaxial cable, and to reduce the variation in the skew.

However, when attempts are made to excessively compress the inner conductor, a plurality of steps become required, and the productivity may deteriorate. For this reason, the area ratio of the third region is preferably 7% or higher. The productivity can be increased by setting the area ratio of the third region to 7% or higher.

In addition, when the area ratio of the third region is set to be 7% or higher, moderate irregularities can remain at the surface of the inner conductor, and thus, it is possible to increase the adhesion when the insulator is arranged around the outer surface of the inner conductor.

(8) The insulator may include a fluororesin.

When the fluororesin is used as the insulator material, the coaxial cable can be bent easily, while providing the heat resistance and the oil resistance.

DETAILS OF EMBODIMENTS OF PRESENT DISCLOSURE

Specific examples of the coaxial cable according to one embodiment of the present disclosure (hereinafter, referred to as "present embodiment") will be described below, with reference to the drawings. The present invention is not limited to these examples, and includes all variations within the meaning and scope of the claims and equivalents thereof.

[Coaxial Cable]

Figure 2:
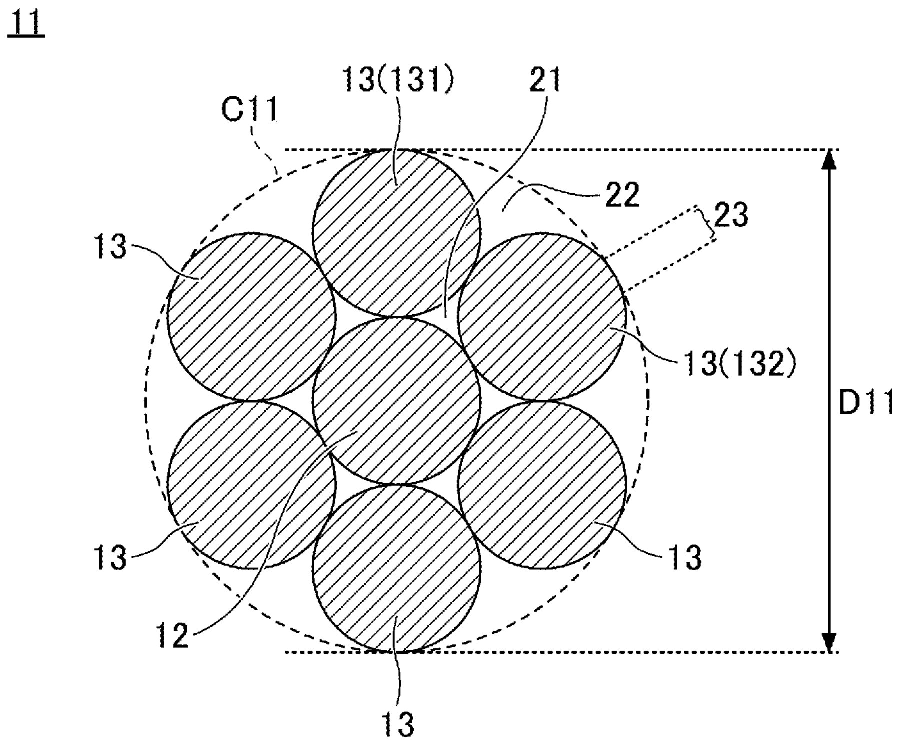
FIG. 2 is a cross sectional view of an inner conductor of the coaxial cable according to one embodiment of the present disclosure along the plane perpendicular to the longitudinal direction.
Figure 3:
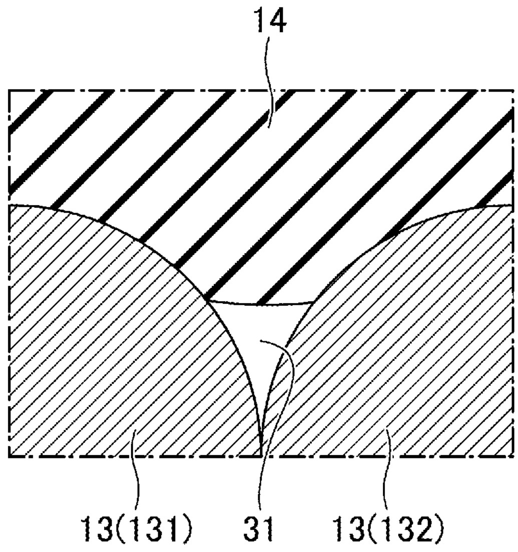
FIG. 3 is a diagram illustrating a region A in FIG. 1 on an enlarged scale.

FIG. 1 illustrates an example of a configuration of a cross section of the coaxial cable according to the present embodiment, perpendicular to the longitudinal direction. FIG. 2 illustrates an inner conductor 11 on an enlarged scale. In addition, FIG. 3 illustrates a region A in FIG. 1 on an enlarged scale.

As illustrated in FIG. 1, a coaxial cable 10 according to the present embodiment may include the inner conductor 11, an insulator 14 covering an outer periphery of the inner conductor 11, and a shield conductor 15 covering an outer periphery of the insulator 14.

The inner conductor 11 includes one center wire 12, and six outer wires 13 arranged around the center wire 12. The inner conductor 11 can be a stranded wire in which the one center wire 12 and the six outer wires 13 are stranded together.

A description will be given below of each of the members.

(1) Inner Conductor (1-1) Material

The material of the center wire and the outer wires 13 forming the inner conductor 11 is not particularly limited, but silver plated soft copper wire may be favorably used therefor.

By using the silver plated soft copper wire as the material of the center wire 12 and the outer wires 13 forming the inner conductor 11, a coaxial cable having a high reliability and excellent high frequency characteristics can be obtained.

(1-2) Configuration

The inner conductor 11 may be a compressed conductor which has been compressed from the outer periphery thereof. In FIG. 1 and FIG. 2, each wire is schematically illustrated as having a circular shape, but because of the compressed configuration described above, each wire has a compressed and distorted shape which is not a perfect circular shape.

A delay time of the coaxial cable is generally determined by three parameters, namely, an outer diameter of the inner conductor, an outer diameter of the insulator, and an electrostatic capacitance of the coaxial cable. In order to reduce the variation in the skew of the coaxial cable, it is necessary to reduce the variation in the delay time of the coaxial cable. However, because there is little margin for adjusting the outer diameter of the inner conductor and the outer diameter of the insulator, due to restrictions such as standards or the like of the coaxial cable, it is conceivable to reduce the variation in the electrostatic capacitance of the coaxial cable in order to reduce the variation in the skew.

When the stranded wire is used as the inner conductor 11, the variation in the electrostatic capacitance of the coaxial cable is caused by the irregularities at the surface of the stranded wire, randomly generating the gap between the inner conductor 11 and the insulator 14. Hence, it is possible to reduce the variation in the electrostatic capacitance of the coaxial cable, by reducing the variation in the amount of the gap that is generated, while reducing the generation of the gap.

Further, by using the compressed conductor, which is the stranded wire, as the inner conductor 11, it is possible to reduce the irregularities generated at the outer surface of the inner conductor. For this reason, it is possible to reduce the variation in the amount of the gap that is generated, while reducing the generation of the gap between the inner conductor 11 and the insulator 14. Moreover, by using the stranded wire as the inner conductor 11 as described above, the coaxial cable can have an excellent bending resistance.

An outer diameter D11 of a circumscribed circle C11 of the inner conductor 11 is not particularly limited, but is preferably 0.1 mm or greater and 0.4 mm or less, and more preferably 0.15 mm or greater and 0.3 mm or less. When the outer diameter D11 of the circumscribed circle C11 of the inner conductor 11 is 0.4 mm or less, it is possible to reduce the outer diameter of the coaxial cable, and to make the coaxial cable easy to handle. Further, when the outer diameter D11 of the circumscribed circle C11 of the inner conductor 11 is 0.1 mm or greater, it is possible to make the coaxial cable highly reliable.

The outer diameter D11 of the circumscribed circle C11 of the inner conductor 11 corresponds to the outer diameter of the inner conductor 11.

(1-2-1) Area Ratio of First Region

In the cross section perpendicular to the longitudinal direction of the coaxial cable 10, a ratio of a total area of first regions 21 (refer to FIG. 2) which are respectively formed by a gap between the center wire 12 and two adjacent outer wires 13, with respect to an area of the circumscribed circle C11 of the inner conductor 11, is regarded as an area ratio of the first region. The areas of the first regions 21, and the area of the circumscribed circle C11, are areas obtained in the cross section perpendicular to the longitudinal direction of the coaxial cable 10, as described above. In addition, the area of the circumscribed circle C11 is an area of the circle computed from the outer diameter D11 of the circumscribed circle C11. In the coaxial cable according to the present embodiment, the area ratio of the first region is preferably 0.5% or higher and 2.0% or lower, and more preferably 0.6% or higher and 1.9% or lower.

As illustrated in FIG. 2, the gap formed between the center wire 12 and the two adjacent outer wires 131 and 132, is regarded as the first region 21. The inner conductor 11 includes six such first regions 21 along the circumferential direction of the center wire 12, and the total area of the first regions 21 at the six locations is the total area of the first regions 21.

The area ratio of the first region can be computed from the following formula (1).

$$\text{(Area ratio of first regions)}=\text{(Total area of first regions)}\pm\text{(Area of circumscribed circle } C11)\times 100 \quad (1)$$

When the area ratio of the first region is 2.0% or lower, the inner conductor 11 is sufficiently compressed, and it is possible to reduce the irregularities generated at the outer surface of the inner conductor 11. For this reason, when the insulator 14 is arranged around the outer surface of the inner conductor 11, it is possible to reduce the variation in the amount of the gap, while reducing the generation of the gap between the inner conductor 11 and the insulator 14. As a result, it is possible to reduce the variation in the electrostatic capacitance of the coaxial cable, and to reduce the variation in the skew.

However, when attempts are made to excessively compress the inner conductor 11, a plurality of steps become required, and the productivity may deteriorate. For this reason, the area ratio of the first region is preferably 0.5% or higher. When the area ratio of the first region to 0.5% or higher, it is possible to increase the productivity.

(1-2-2) Area Ratio of Second Region

A ratio of a total area of second regions 31 (refer to FIG. 3) which are respectively famed by a gap between surfaces of the two adjacent outer wires 131 and 132 and a surface of the insulator 14, with respect to an area of the circumscribed circle C11 of the inner conductor 11, is regarded as an area ratio of the second region. The area of the second region 31 is the area obtained in the cross section perpendicular to the longitudinal direction of the coaxial cable 10. In the coaxial cable according to the present embodiment, the area ratio of the second region is preferably 2.0% or higher and 5.0% or lower, and more preferably 2.5% or higher and 4.5% or lower.

As illustrated in FIG. 3, which is an enlarged view of the region A in FIG. 1, the gap formed between the surfaces of the two adjacent outer wires 131 and 132 and the insulator 14, is regarded as the second region 31. The inner conductor 11 includes six such second regions along the circumferential direction of the inner conductor 11, and the total area of the second regions 31 at the six locations is the total area of the second regions 31.

The area ratio of the second region can be computed from the following formula (2).

$$\text{(Area ratio of second regions)}=\text{(Total area of second regions)}/\text{(Area of circumscribed circle } C11)\times 100 \quad (2)$$

The area ratio of the second region indicates the extent to which the irregularities at the surface of the inner conductor 11 are filled with the insulator 14. For this reason, when the area ratio of the second region to 5.0% or lower, the amount of the gap between the inner conductor 11 and the insulator 14 is sufficiently reduced. As a result, it is possible to reduce the variation in the electrostatic capacitance of the coaxial cable, and to reduce the variation in the skew.

However, it is difficult to completely fill the irregularities at the surface of the inner conductor 11 with the insulator 14. Accordingly, the area ratio of the second region is preferably 2.0% or higher. When the area ratio of the second region is 2.0% or higher, it is possible to increase the productivity.

(1-2-3) Area Ratio of Third Region

A ratio of a total area of third regions respectively surrounded by the circumscribed circle C11 of the inner conductor 11 and the surfaces of the two adjacent outer wires 13, with respect to the area of the circumscribed circle C11 of the inner conductor 11, is regarded as an area ratio of the third region. The area of the third region 22 is the area obtained in the cross section perpendicular to the longitudinal direction of the coaxial cable 10. In the coaxial cable of the present embodiment, the area ratio of the third region is preferably 7% or higher and 14% or lower, and more preferably 9% or higher and 13.5% or lower.

As illustrated in FIG. 2, the third region 22 is the area surrounded by the circumscribed circle C11 of the inner conductor 11 and the surfaces of the two adjacent outer wires 131 and 132. The inner conductor 11 includes six such third regions along the circumferential direction of the inner conductor 11, and the total area of the third regions 22 at the six locations is the total area of the third regions 22.

The area ratio of the third region can be computed from the following formula (3).

$$\text{(Area ratio of third regions)}=\text{(Total area of third regions)}/\text{(Area of circumscribed circle } C11)\times 100 \quad (3)$$

The area ratio of the third region 22 is an index of the degree of irregularities on the outer surface of the inner conductor 11. The area ratio of the third region 22 is also an indicator of the degree of compression of the inner conductor 11, and the higher the degree of compression, the smaller the area ratio.

When the area ratio of the third region is 14% or lower, the inner conductor 11 is sufficiently compressed, and it is possible to reduce the irregularities generated at the outer surface of the inner conductor 11. For this reason, when the insulator 14 is arranged around the outer surface of the inner conductor 11, it is possible to reduce the variation in the amount of the gap, while reducing the generation of the gap between the inner conductor 11 and the insulator 14. As a result, it is possible to reduce the variation in the electrostatic capacitance of the coaxial cable, and to reduce the variation in the skew.

However, when attempts are made to excessively compress the inner conductor, a plurality of steps become required, and the productivity may deteriorate. For this reason, the area ratio of the third region is preferably 7% or higher. When the area ratio of the third region is 7% or higher, it is possible to increase the productivity.

In addition, when the area ratio of the third region is set to be 7% or higher, moderate irregularities can remain at the surface of the inner conductor, and thus, it is possible to increase the adhesion when the insulator 14 is arranged around the outer surface of the inner conductor 11.

(1-2-4) Ratio of Total Length of Contact Portion where Circumference of Circumscribed Circle and Inner Conductor Make Contact, with Respect to Circumference of Circumscribed Circle of Inner Conductor A ratio of a total length of contact portions 23 where the circumference of the circumferential circle C11 of the inner conductor 11 and the inner conductor 11 make contact, with respect to the circumference of the circumscribed circle C11 of the inner conductor 11, is preferably 40% or higher and 70% or lower. The length of the contact portion 23 is the length obtained in the cross section perpendicular to the longitudinal direction of the coaxial cable 10.

For example, as illustrated in FIG. 2, the contact portion 23 refers to a portion where the circumference of the circumferential circle C11 of the inner conductor 11 makes contact with the inner conductor 11. The inner conductor 11 includes six such contact portions along the circumferential direction of the circumscribed circle C11. For this reason, the total length of the contact portions 23 at the six locations is the total length of the contact portions 23 where the circumference of the circumscribed circle C11 and the inner conductor 11 make contact (hereinafter also referred to as "total length of the contact portions").

The ratio of the total length of the contact portions where the circumference of the circumferential circle of the inner conductor and the inner conductor make contact, with respect to the circumference of the circumscribed circle of the inner conductor (hereinafter also referred to as "ratio of the contact portions"), can be computed from the following formula (4).

$$\text{(Ratio of contact portions)} = \text{(Total length of contact portions)}/\text{(length of circumference of circumscribed circle } C11) \times 100 \quad (4)$$

When the inner conductor 11 is completely compressed, the cross section perpendicular to the longitudinal direction becomes circular, and completely overlaps the circumscribed circle C11. In other words, the ratio of the contact portions described above becomes 100%.

However, when attempts are made to excessively compress the inner conductor, as described above, a plurality of steps become required, and the productivity may deteriorate. For this reason, the ratio of the contact portions is preferably 70% or lower. When the ratio of the contact portions is 70% or lower, it is possible to increase the productivity.

In addition, when the ratio of the contact portions is 40% or higher, the inner conductor is sufficiently compressed. For this reason, when the insulator 14 is arranged around the outer surface of the inner conductor 11, the amount of the gap between the inner conductor 11 and the insulator 14 is sufficiently reduced. As a result, it is possible to reduce the variation in the electrostatic capacitance of the coaxial cable, and to reduce the variation in the skew.

(2) Insulator (2-1) Material

The material of the insulator 14 is not particularly limited, but a fluororesin, for example, may be used therefor. In other words, the insulator 14 may include the fluororesin.

By using the fluororesin as the material of the insulator 14, the coaxial cable can be bent easily, while providing the heat resistance and the oil resistance.

The fluororesin may used one or more kinds of materials selected from ethylene tetrafluoroethylene copolymer (ETFE), polytetrafluoroethylene (PTFE), tetrafluoroethylene perfluoroalkylvinyl ether copolymer (PFA), tetrafluoroethylene hexafluoride copolymer (FEP), vinylidene fluoride resin (PVDF), or the like, for example.

The insulator 14 may be coated on the inner conductor 11 by drawdown extrusion molding, for example.

(2-1) Outer Diameter

An outer diameter D14 of the insulator 14 is not particularly limited, and is preferably 0.25 mm or greater and 1.5 mm or less, and more preferably 0.4 mm or greater and 1.2 mm or less.

When the outer diameter D14 of the insulator 14 is 0.25 mm or greater, it is possible to particularly increase the bending resistance. Further, when the outer diameter D14 of the insulator 14 is 1.5 mm or less, it is possible to reduce the outer diameter of the coaxial cable, and to make the coaxial cable easy to handle.

(3) Shield Conductor

The shield conductor 15 has a configuration in which shield wires 151 are spirally wound around the outer periphery of the insulator 14, or the shield wires 151 have a braided configuration. The shield conductor 15 preferably has the spirally wound configuration. When the shield conductor 15 is the spiral shield conductor, the coaxial cable can be made more flexible than a coaxial cable having the braided configuration, and the bending resistance can be increased.

Copper, aluminum, copper alloy, or the like may be used as the material of the shield wires 151 forming the shield conductor 15. For this reason, hard copper wire or the like may be used as the material of the shield wires 151. The shield wires 151 may be plated with silver or tin on the surface thereof. Hence, a silver plated copper alloy, a tin plated copper alloy, or the like may be used as the material of the metal wires forming the shield conductor.

The shield conductor 15 can be formed by lap winding a copper deposited polyester tape or the like, for example, on the outer surface of the insulator 14.

(4) Sheath

The coaxial cable 10 may include a sheath 16 arranged around an outer periphery of the shield conductor 15.

The material of the sheath 16 is not particularly limited, and fluororesins, such as polytetrafluoroethylene (PTFE), tetrafluoroethylene perfluoroalkylvinyl ether copolymer (PFA), fluororesins such as ethylene tetrafluoride propylene hexafluoride copolymer (FEP), ethylene tetrafluoroethylene copolymer (ETFE), or the like, polyester resins, such as polyethylene terephthalate (PET) or the like, or the like, may be used therefor.

For example, the sheath 16 may be famed by wrapping a polyester tape or the like around the outer periphery of the shield conductor 15.

While the embodiments have been described in detail above, various variations and modifications may be made within the scope of the appended claims, and the present invention is not limited to specific embodiments.

EXEMPLARY IMPLEMENTATIONS

Although specific exemplary implementations will be described below, the present invention is not limited to these exemplary implementations.

(Evaluation Method)

First, a method for evaluating coaxial cables manufactured according to the following example experiments will be described.

(1) The outer diameter D11 of the circumscribed circle C11 of the inner conductor 11, and the outer diameter D14 of the insulator:

The outer diameter D11 of the circumscribed circle C11 of the inner conductor 11 was determined by observing an arbitrary cross section perpendicular to the longitudinal direction of the coaxial cable with a microscope, drawing the circumscribed circle C11 of the inner conductor 11, and measuring the diameter of the circumscribed circle C11. The outer diameter D11 of the circumscribed circle C11 of the inner conductor 11 corresponds to the outer diameter of the inner conductor 11.

The outer diameter D14 of the insulator 14 was also determined by observing a cross section thereof with the microscope, drawing the circumscribed circle of the insulator 14, and measuring the diameter of the circumscribed circle.

The area ratio of the first regions, the area ratio of the second regions, the area ratio of the third regions, and the area ratio of the contact portions described below are also measured from the same cross section.

(2) The area ratio of the first regions, the area ratio of the second regions, the area ratio of the third regions, and the area ratio of the contact portions:

With respect to an arbitrary cross section perpendicular to the longitudinal direction of the coaxial cables manufactured according to the following example experiments, the observation was made with the microscope to measure the area of the first regions, the area of the second regions, and the area of the third regions. Then, the area ratio of the first region, the area ratio of the second region, and the area ratio of the third region, with respect to the area of the circumscribed circle C11 determined from the outer diameter D11 of the circumscribed circle C11 of the inner conductor 11 and measured in advance, were computed, respectively.

In addition, in the observed image, the total length of the contact portions where the circumference of the circumscribed circle C11 and the inner conductor 11 make contact with each other, with respect to the circumference of the circumscribed circle C11 of the inner conductor 11, was measured, to compute the ratio of the contact portions.

(3) Maximum Value of Skew:

Two coaxial cables manufactured according to the following example experiments were prepared for each sample, and a digital serial analyzer was used to send electrical pulses with respect to the two high-frequency coaxial cables having a predetermined length, to measure the delay time per 1 m.

From the measured results of the delay time for 10 samples, a value is obtained by subtracting a minimum delay time from a maximum delay time, and this value is indicated as a "maximum value of skew" in Table 1.

Figure 4:
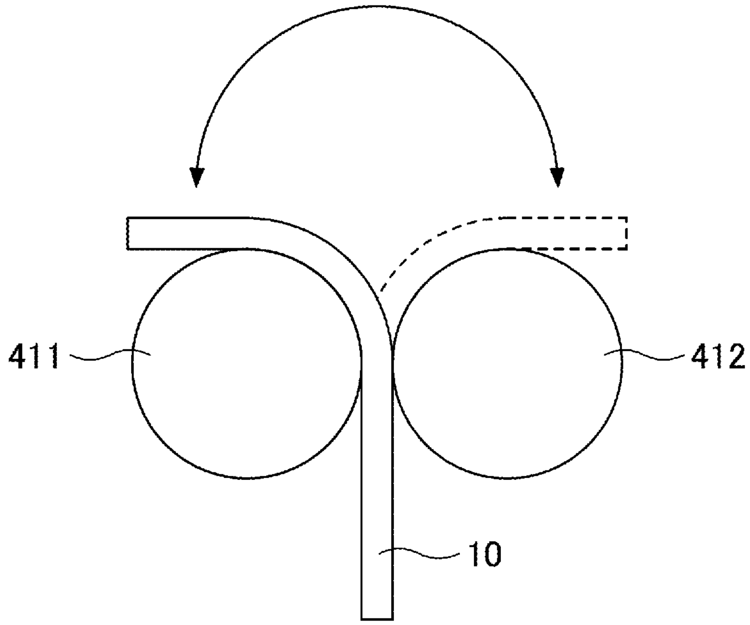
FIG. 4 is a diagram for explaining a bending test.

(4) Bending Test:

As illustrated in FIG. 4, the coaxial cable 10 to be evaluated was arranged and pinched between two mandrels 411 and 412 which have a diameter of 4 mm and are arranged horizontally and parallel to each other, and a load of 200 g was applied vertically downward with respect to the coaxial cable 10. In this state, after bending an upper end of the coaxial cable 10 by 90° in the horizontal direction to make contact with an upper end of one mandrel 411, the upper end of the coaxial cable 10 was bent by 90° in the horizontal direction to make contact with an upper end of the other mandrel 412, and such bending operations were repeated.

The number of times the coaxial cable is bent was counted until breaking the coaxial cable. The number of times the coaxial cable is bent is counted as one, when the coaxial cable is bent to the left, thereafter bent to the right, and then returns to the left. According to the number of times the coaxial cable is bent, which is a result of a bending test, the larger the number of times the coaxial cable is bent, the better the bending resistance is.

The coaxial cables according to each of the example experiments will be described below. An example experiment 1 and an example experiment 2 are exemplary implementations, and an example experiment 3 is a comparative example.

Example Experiment 1

The coaxial cable was manufactured according to the following procedure.

A stranded wire was prepared by stranding seven wires, which are silver plated soft copper wires having a wire diameter of 0.102 mm. Then, the stranded wire was compressed into a compressed conductor which is used as the inner conductor 11.

The stranded wire has a configuration in which six outer wires are arranged around one center wire. The same wire is used for the center wire and the outer wires.

The insulator 14 made of FEP was arranged around the outer periphery of the inner conductor 11. The thickness of the insulator 14 was adjusted so that the outer diameter of the insulator 14 becomes 0.79 mm.

Next, a tin plated soft copper wire was spirally wound around the outer periphery of the insulator 14, to form a shield conductor.

Further, a polyester tape was adhered to the outer periphery of the shield conductor 15, to form the sheath 16, thereby manufacturing the coaxial cable according to this example experiment.

Figure 5:
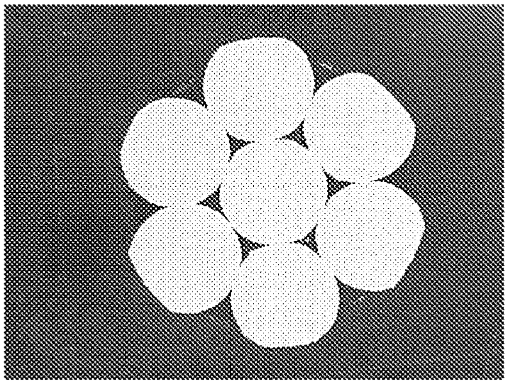
FIG. 5 is a photograph of a cross section of the inner conductor used in an example experiment 1 along the plane perpendicular to the longitudinal direction.

The evaluation described above was performed with respect to the manufactured coaxial cable. The results of the evaluation are illustrated in Table 1. In addition, a photograph of a cross section of the inner conductor, perpendicular to the longitudinal direction, is illustrated in FIG. 5.

Example Experiment 2

The coaxial cable was manufactured and evaluated in a manner similar to the example experiment, except that the extent of compressing the stranded wire was changed for the inner conductor 11.

Figure 6:
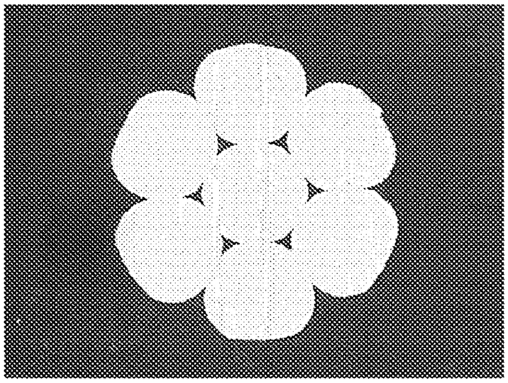
FIG. 6 is a photograph of the cross section of the inner conductor used in an example experiment 2 along the plane perpendicular to the longitudinal direction.

The results of the evaluation are illustrated in Table 1. A photograph of a cross section of the inner conductor, perpendicular to the longitudinal direction, is illustrated in FIG. 6.

Example Experiment 3

The coaxial cable was manufactured and evaluated in a manner similar to the example experiment 1, except that the stranded wire is not compressed for the inner conductor 11.

Figure 7:
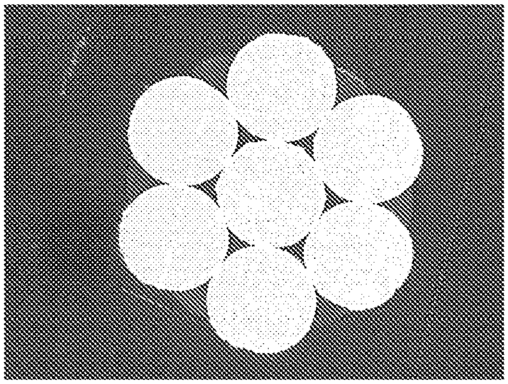
FIG. 7 is a photograph of the cross section of the inner conductor used in an example experiment 3 along the plane perpendicular to the longitudinal direction.

The results of the evaluation are illustrated in Table 1. A photograph of a cross section of the inner conductor, perpendicular to the longitudinal direction, is illustrated in FIG. 7.

TABLE 1

| | | | | Example experiment 1 | Example experiment 2 | Example experiment 3 |
|---|---|---|---|---|---|---|
| Inner conductor | Material | | | Silver plated soft conductor | | |
| | Configuration | Number of wires | Wires | 7 | | |
| | | Wire diameter | mm | 0.102 | | |
| | Outer diameter D11 | | mm | 0.297 | 0.280 | 0.306 |
| | Area of circle computed from outer diameter of conductor | | $mm^2$ | 0.069 | 0.062 | 0.074 |

TABLE 1-continued

| | | | Example experiment 1 | Example experiment 2 | Example experiment 3 |
|---|---|---|---|---|---|
| Insulator | Material | | | FEP | |
| | Thickness | mm | 0.25 | 0.26 | 0.24 |
| | Outer diameter D14 of insulator | mm | 0.79 | 0.79 | 0.79 |
| Shield conductor | Material | | | Tin plated soft copper wire | |
| | Wire diameter | mm | | 0.05 | |
| | Configuration | | | Spiral | |
| Sheath | Material | | | Polyester | |
| | Outer diameter | mm | 0.94 | 0.94 | 0.94 |
| Area ratio of first region | | % | 1.73 | 0.97 | 2.45 |
| Area ratio of second region | | % | 4.33 | 2.92 | 6.53 |
| Area ratio of third region | | % | 13.00 | 9.75 | 19.59 |
| Ratio of contact portion | | % | 40 | 60 | 20 |
| Maximum value of skew | | ps/m | 7.5 | 7.0 | 8.5 |
| Bending test | | Number of times | 4765 | 5348 | 6013 |

According to the results illustrated in Table 1, it was confirmed that the maximum value of the skew is 7.5 ps/m or less for the coaxial cables according to the example experiment 1 and the example experiment 2 in which the area ratio of the first region is 0.5% or higher and 2.0% or lower, and the area ratio of the second region is 2.0% or higher and 5.0% or lower. In other words, it was confirmed that the variation in the skew can be reduced compared to the coaxial cable according to the example experiment 3 in which the area ratio of the first region or the like are not satisfied.

In addition, the results of the bending test for the coaxial cables according to the example experiment 1 and the example experiment 2 were 4500 times or more, and it was confirmed that these coaxial cables have a sufficient bending resistance.

DESCRIPTION OF THE REFERENCE NUMERALS

10 Coaxial cable
11 Inner conductor
12 Center wire
13, 131, 132 Outer wire
14 Insulator
15 Shield conductor
151 Shield wire
16 Sheath
21 First region
22 Third region
23 Contact portion
31 Second region
411, 412 Mandrel
A Region
C11 Circumscribed circle
D11 Outer diameter
D14 Outer diameter

The invention claimed is:

1. A coaxial cable comprising:

an inner conductor having one center wire, and six outer wires stranded around the center wire;

an insulator covering an outer periphery of the inner conductor; and a shield conductor covering an outer periphery of the insulator, wherein, in a cross section perpendicular to a longitudinal direction of the coaxial cable, a ratio of a total area of first regions which are respectively formed by a gap between the center wire and two adjacent outer wires, with respect to an area of a circumscribed circle of the inner conductor, is 0.5% or higher and 2.0% or lower, and a ratio of a total area of second regions which are respectively formed by a gap between surfaces of the two adjacent outer wires and a surface of the insulator, with respect to the area of the circumscribed circle of the inner conductor, is 2.0% or higher and 5.0% or lower.

2. The coaxial cable as claimed in claim 1, wherein a ratio of a total length of contact portions where a circumference of the circumscribed circle and the inner conductor make contact, with respect to the circumference of the circumscribed circle of the inner conductor, is 40% or higher and 70% or lower.

3. The coaxial cable as claimed in claim 2, wherein an outer diameter of the circumscribed circle of the inner conductor is 0.1 mm or greater and 0.4 mm or less.

4. The coaxial cable as claimed in claim 2, wherein an outer diameter of the insulator is 0.25 mm or greater and 1.5 mm or less.

5. The coaxial cable as claimed in claim 2, wherein the center wire and the outer wires are silver plated soft copper wires.

6. The coaxial cable as claimed in claim 2, wherein the shield conductor is a spiral shield conductor.

7. The coaxial cable as claimed in claim 2, wherein a ratio of a total area of third regions respectively surrounded by the circumscribed circle of the inner conductor and the surfaces of the two adjacent outer wires, with respect to the area of the circumscribed circle of the inner conductor, is 7% or higher and 14% or lower.

8. The coaxial cable as claimed in claim 2, wherein the insulator includes a fluororesin.

9. The coaxial cable as claimed in claim 1, wherein an outer diameter of the circumscribed circle of the inner conductor is 0.1 mm or greater and 0.4 mm or less.

10. The coaxial cable as claimed in claim 1, wherein an outer diameter of the insulator is 0.25 mm or greater and 1.5 mm or less.

11. The coaxial cable as claimed in claim 1, wherein the center wire and the outer wires are silver plated soft copper wires.

12. The coaxial cable as claimed in claim 1, wherein the shield conductor is a spiral shield conductor.

13. The coaxial cable as claimed in claim 1, wherein a ratio of a total area of third regions respectively surrounded by the circumscribed circle of the inner conductor and the surfaces of the two adjacent outer wires, with respect to the area of the circumscribed circle of the inner conductor, is 7% or higher and 14% or lower.

14. The coaxial cable as claimed in claim 1, wherein the insulator includes a fluororesin.

* * * * *